(12) United States Patent
Senci et al.

(10) Patent No.: US 10,915,838 B2
(45) Date of Patent: Feb. 9, 2021

(54) SYSTEMS AND METHODS FOR DETERMINING RESTAURANT CAPACITY LEVEL

(71) Applicant: MasterCard International Incorporated, Purchase, NY (US)

(72) Inventors: David J. Senci, Troy, IL (US); Todd Woodruff, St. Charles, MO (US); Peng Yang, Chesterfield, MO (US); Ravi Santosh Arvapally, O'Fallon, MO (US); Matt Scott Morice, St. Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1268 days.

(21) Appl. No.: 15/172,046

(22) Filed: Jun. 2, 2016

(65) Prior Publication Data
US 2017/0351981 A1 Dec. 7, 2017

(51) Int. Cl.
*G06Q 10/06* (2012.01)
*G06Q 30/02* (2012.01)
(Continued)

(52) U.S. Cl.
CPC ..... *G06Q 10/0631* (2013.01); *G06Q 30/0201* (2013.01); *G06Q 10/02* (2013.01); *G06Q 50/12* (2013.01)

(58) Field of Classification Search
CPC .............. G06Q 10/0631; G06Q 10/02; G06Q 30/0201; G06Q 50/12
(Continued)

(56) References Cited

U.S. PATENT DOCUMENTS 4,530,067 A 7/1985 Dorr
5,502,806 A 3/1996 Mahoney et al.
(Continued)

OTHER PUBLICATIONS

A model for identifying the optimal capacity utilization range for a monopolistically competitive restaurant firm. Muller, Christopher Craig. Cornell University, ProQuest Dissertations Publishing, 1992. 9300827.*

(Continued)

*Primary Examiner* — Timothy Padot
(74) *Attorney, Agent, or Firm* — Armstrong Teasdale LLP

(57) ABSTRACT

A capacity analysis computing device for determining a restaurant capacity level is provided. The capacity analysis computing device is configured to store historical transaction data for a restaurant for a period of time, and analyze the historical transaction data to identify a maximum restaurant capacity for the restaurant over the period of time. The capacity analysis computing device is also configured to receive, from a user computing, a selected time interval for which a current capacity level is to be determined. The capacity analysis computing device is further configured to identify a similar historical time interval to the selected time interval, and determine a historical capacity level for the restaurant during the similar historical time interval. The capacity analysis computing device is further configured to assign the historical capacity level as the current capacity level for the restaurant, and display the current capacity level on the user computing device.

26 Claims, 6 Drawing Sheets

(51) Int. Cl.
  *G06Q 50/12* (2012.01)
  *G06Q 10/02* (2012.01)
(58) Field of Classification Search
  USPC ........................................................ 705/7.12
  See application file for complete search history.

(56) References Cited

U.S. PATENT DOCUMENTS

| | | | |
|---|---|---|---|
| 6,366,890 B1* | 4/2002 | Usrey | G06Q 10/087 |
| | | | 705/28 |
| 7,069,228 B1* | 6/2006 | Rose | G06Q 10/02 |
| | | | 705/5 |
| 2004/0215517 A1 | 10/2004 | Chen et al. | |
| 2007/0136110 A1 | 6/2007 | Presley et al. | |
| 2007/0250355 A1 | 10/2007 | Leet et al. | |
| 2009/0048884 A1* | 2/2009 | Olives | G06Q 40/12 |
| | | | 705/7.33 |
| 2009/0292566 A1* | 11/2009 | Bossert | G06Q 10/02 |
| | | | 705/5 |
| 2010/0015993 A1* | 1/2010 | Dingier | H04L 67/18 |
| | | | 455/456.1 |
| 2013/0090959 A1 | 4/2013 | Kvamme et al. | |
| 2013/0103452 A1* | 4/2013 | Burks | G06Q 10/06 |
| | | | 705/7.25 |
| 2014/0244324 A1* | 8/2014 | Ford | G06Q 50/12 |
| | | | 705/5 |
| 2014/0379508 A1* | 12/2014 | Sangasani | G06Q 30/00 |
| | | | 705/26.1 |
| 2016/0314482 A1* | 10/2016 | Basu | G06Q 30/0251 |

OTHER PUBLICATIONS

Joint demand and capacity management in a restaurant system. Hwang, Johye et al. European Journal of Operational Research 207 (2010) 465-472.*

OpenTable Introduces Free Mobile Application for BlackBerry Smartphones Business Wire Aug. 3, 2009: NA.*

* cited by examiner

SYSTEMS AND METHODS FOR DETERMINING RESTAURANT CAPACITY LEVEL

BACKGROUND

This invention relates generally to merchant analytics and, more particularly, to systems and methods for determining restaurant capacity level using historical data for the restaurant.

Consumers are interested in goods and services that can meet their needs in a timely fashion. It can be a disappointment and an inconvenience for consumers to arrive at a restaurant only to find that restaurant full to capacity or unable to seat or serve them for an unacceptable amount of time. Accordingly, consumers attempt to prevent such issues by using personal experience and anecdotal or unsubstantiated advice from friends to avoid the most crowded restaurants or the busiest times. However, such a method is unreliable and may frequently be incorrect. It would be desirable to have a system that may more accurately determine and present restaurant capacity levels.

BRIEF DESCRIPTION

In one aspect, a capacity analysis computing device for determining a restaurant capacity level is provided. The capacity analysis computing device includes a processor in communication with a memory. The processor is programmed to store, in the memory, historical transaction data for a restaurant for a period of time, and analyze the historical transaction data for the restaurant to identify a maximum restaurant capacity for the restaurant over at least a portion of the period of time. The processor is also programmed to receive, from a user computing device in communication with the capacity analysis computing device, a selected time interval for which a current capacity level is to be determined. A capacity level represents a restaurant occupancy relative to the maximum restaurant capacity. The processor is further programmed to identify a similar historical time interval to the selected time interval, the similar historical time interval occurring within the period of time, and determine a historical capacity level for the restaurant during the similar historical time interval using the historical transaction data corresponding to the similar historical time interval. The processor is still further programmed to assign the historical capacity level as the current capacity level for the restaurant, and display the current capacity level on a user interface of the user computing device.

In another aspect, a computer-implemented method for determining a restaurant capacity level using a capacity analysis computing device is provided. The capacity analysis computing device includes a processor in communication with a memory. The method includes storing, in the memory, historical transaction data for a restaurant for a period of time, and analyzing the historical transaction data for the restaurant to identify a maximum restaurant capacity for the restaurant over at least a portion of the period of time. The method also includes receiving, from a user computing device in communication with the capacity analysis computing device, a selected time interval for which a current capacity level is to be determined. A capacity level represents a restaurant occupancy relative to the maximum restaurant capacity. The method further includes identifying a similar historical time interval to the selected time interval, the similar historical time interval occurring within the period of time, and determining a historical capacity level for the restaurant during the similar historical time interval using the historical transaction data corresponding to the similar historical time interval. The method still further includes assigning the historical capacity level as the current capacity level for the restaurant, and displaying the current capacity level on a user interface of the user computing device.

In yet another aspect, at least one non-transitory computer-readable storage media having computer-executable instructions embodied thereon is provided. When executed by at least one processor in communication with a memory, the computer-executable instructions cause the processor to store, in the memory, historical transaction data for a restaurant for a period of time, and analyze the historical transaction data for the restaurant to identify a maximum restaurant capacity for the restaurant over at least a portion of the period of time. The computer-executable instructions also cause the processor to receive, from a user computing device, a selected time interval for which a current capacity level is to be determined. A capacity level represents a restaurant occupancy relative to the maximum restaurant capacity. The computer-executable instructions further cause the processor to identify a similar historical time interval to the selected time interval, the similar historical time interval occurring within the period of time, and determine a historical capacity level for the restaurant during the similar historical time interval using the historical transaction data corresponding to the similar historical time interval. The computer-executable instructions still further cause the processor to assign the historical capacity level as the current capacity level for the restaurant, and display the current capacity level on a user interface of the user computing device.

BRIEF DESCRIPTION OF THE DRAWINGS

FIG. 1 is a simplified schematic block diagram of a merchant analytics system for determining restaurant capacity level using historical transaction data retrieved from a transaction database.

FIG. 2 illustrates an example configuration of a user system that may be used in the merchant analytics system shown in FIG. 1.

FIG. 3 illustrates an example configuration of a server computing device such as a capacity analysis computing device as shown in FIG. 1.

FIG. 4 is a data flow diagram illustrating the flow of data between various components of the merchant analytics system shown in FIG. 1.

FIG. 5 is a flowchart of an example method for determining restaurant capacity level using the merchant analytics system shown in FIG. 1.

FIG. 6 shows a diagram of components of an example computing device that may be used in the merchant analytics system shown in FIG. 1 to determine restaurant capacity level.

Like numbers in the Figures indicate the same or functionally similar components.

DETAILED DESCRIPTION

Figure 1:
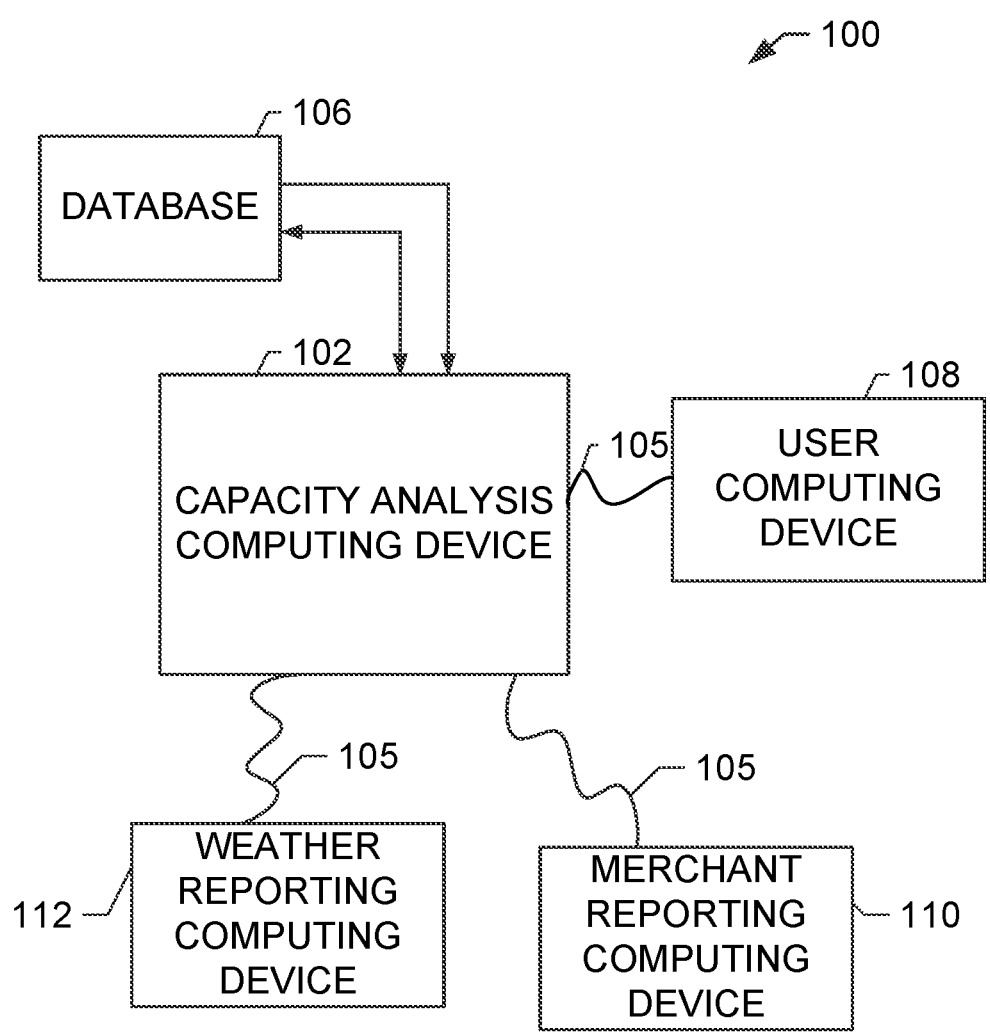
FIGS. 1-6 show example embodiments of the methods and systems described herein.

The merchant analytics system described herein is configured to determine and display a current capacity level for a merchant, particularly a restaurant, by processing historical data associated with the merchant. In particular, the merchant analytics system includes and/or is in communication with at least one of a payment processor configured to process transactions initiated by cardholders using payment cards (e.g., credit cards, debit card, prepaid cards, etc.) and a transaction database configured to store data associated with said transactions ("transaction data"). Transaction data includes such elements as a transaction amount, a description of the purchase made, a merchant identifier, an account identifier (associating the transaction with a consumer or account holder), and a time and date stamp. The merchant analytics system includes a capacity analysis computing device configured to retrieve and process historical (i.e., past) transaction data associated with a merchant (i.e., a restaurant) to determine a current capacity level of the restaurant. As used herein, "restaurant" refers to any merchant serving food and/or beverages, such as fast food restaurants, "sit-down" restaurants, bars, eating establishments within other merchants (e.g., a café within a bookstore), etc. The capacity analysis computing device includes a processor in communication with a memory.

In the example embodiment, the capacity analysis computing device receives or retrieves historical transaction data from the payment processor and/or the transaction database. The historical transaction data is associated with transactions initiated at a restaurant over a particular period of time. For example, the capacity analytics computing device may retrieve and store historical transaction data for the past two years (or any other period of time). The capacity analysis computing device then identifies a maximum restaurant capacity for the restaurant using the historical transaction data. In one embodiment, the capacity analysis computing device identifies a top percentile (e.g., top 5%) of transaction velocity within the historical transaction data over the period of time. Transaction velocity represents a number of transactions initiated per unit time (e.g., 40 transactions per hour). The capacity analysis computing device may then average the top percentile transaction velocity (and/or perform alternative weighting functions thereon) and define the maximum restaurant capacity as that average number of transactions per unit time. For example, the capacity analysis computing device may define the maximum restaurant capacity as "40 transactions" (per unit time).

The capacity analysis computing device then selects a time interval of interest, for which a "current capacity level" is to be determined. "Capacity level" represents a restaurant capacity or occupancy level relative to the maximum restaurant capacity or occupancy, or how full the restaurant is compared to its maximum "fullness." In other words, capacity level serves as a proxy measure for "crowdedness." In one embodiment, the capacity analysis computing device receives a selection of the time interval from a user computing device (e.g., a smart phone, personal computer, tablet, etc.) operated by a user. For example, a user may open an application ("app") on their smart phone, the app configured to enable access to the capacity analysis computing device by the smart phone. The user may select a time interval during which they wish to dine, such as "6:00 PM-6:30 PM," as the user wishes to learn how crowded the restaurant is during that time interval. As another example, the user may select a plurality of time intervals, as the user wishes to learn which of the plurality of time intervals is the best (e.g., least crowded) time interval to dine at the restaurant.

In order to determine the capacity level for the selected time interval, the capacity analysis computing device identifies a similar time interval within the period of time for which the historical capacity level may be determined. The capacity analysis computing device then applies the historical capacity level to the current capacity level, "assuming" that for time intervals with one or more shared key characteristics, the capacity level for the restaurant will be similar. Accordingly, the capacity analysis computing device may determine current capacity levels or "crowdedness" for a plurality of restaurants without requiring any real-time input from the restaurants themselves, such that the methods and systems described herein are much more easily and securely implemented than capacity-determining systems requiring input from merchants.

In the example embodiment, the capacity analysis computing device identifies the similar historical time interval by determining one or more characteristics about the selected time interval and identifying or retrieving a historical time interval sharing those one or more characteristics. These characteristics may include a time of day (e.g., the particular time interval or a more general "morning/afternoon/evening"), a day of the week (e.g., a particular day or a more general "weekday/weekend"), a month, and/or a time of year or season. These characteristics may also include weather information. The capacity analysis computing device may receive historical weather information for the period of time from a third-party weather reporting computing device, and may store the historical weather information in the memory. The capacity analysis computing device may also receive current and/or future weather information from the same or a different weather reporting computing device, such that the capacity analysis computing device may determine the current or future weather conditions associated with the selected time interval. The capacity analysis computing device may be configured to weight one or more characteristics more heavily when identifying the similar historical time interval. Additionally or alternatively, the capacity analysis computing device may be configured to define a particular number of characteristics that the historical time interval must share with the selected time interval in order to be identified as the similar historical time interval.

Once the capacity analysis computing device has identified the similar historical time interval, the capacity analysis computing device determines a historical capacity level for the restaurant over the similar historical interval using the historical transaction data corresponding to the similar historical interval. In one embodiment, the capacity analysis computing device retrieves and processes the historical transaction data to determine the number of transactions initiated at the restaurant within the similar historical time interval. The capacity analysis computing device may divide the transaction count for the similar historical interval (e.g., 20 transactions) by the maximum capacity level (e.g., 40 transactions) to determine the historical capacity level (e.g., 50%). The capacity analysis computing device may perform such calculations when data is stored thereat (and/or in a separate database associated with the capacity analysis computing device). Alternatively, the capacity analysis computing device may perform this (and/or any other calculation described herein) when a capacity level request is received.

Additionally or alternatively, the capacity analysis computing device retrieves and processes the historical transaction data to determine an average transaction amount associated with the restaurant over the period of time. For example, the capacity analysis computing device may determine that the average transaction amount for the restaurant is approximately $30. In some embodiments, the capacity analysis computing device is configured to identify outliers, such as larger parties, and process these outlier transactions differently (e.g., divide larger transactions or weight larger transactions less in the average determination). The capacity analysis computing device determines the number of transactions initiated at the restaurant within the similar historical time interval (if it has not already done so, as above). In addition, the capacity analysis computing device determines a total transaction amount (i.e., a total dollar amount or value) of the number of transactions within the similar historical interval. For example, the capacity analysis computing device may determine that 20 transactions were initiated within the similar historical interval, the 20 transactions totaling $900. The capacity analysis computing device then determines an "adjusted number of transactions" by dividing the total transaction amount by the average transaction amount. The adjusted number of transactions is calculated to account for whether the restaurant is occupied by generally smaller parties, average parties, or generally larger parties. Continuing with the above example, the capacity analysis computing device would determine the adjusted number of transactions as $900/$30=30 (which may mean that the parties at the restaurant during this similar historical time interval are larger than average). The capacity analysis computing device then determines the historical capacity level during this similar historical interval by dividing the adjusted number of transactions by the maximum restaurant capacity. Again continuing with the same example, the capacity analysis computing device determines the historical capacity level as 30/40=75%. The capacity analysis computing device may perform such calculations when data is stored thereat (and/or in a separate database associated with the capacity analysis computing device) and/or when historical time intervals are defined. Alternatively, the capacity analysis computing device may perform this (and/or any other calculation described herein) when a capacity level request is received.

The capacity analysis computing device assigns the determined historical capacity level for the similar historical time interval as the current capacity level for the selected time interval. In addition, the capacity analysis computing device displays the current capacity level, for example, at the user computing device. For example, the capacity analysis computing device may transmit a signal to the user computing device to display the capacity level to the user within the app. In some embodiments, the capacity level for one restaurant is displayed relative to similarly determined capacity levels for alternative restaurants (e.g., as a bar chart). The user may determine which restaurant of many restaurants best meets their needs at that particular time interval. In some embodiments, the capacity level for the restaurant at one time interval is displayed relative to the capacity levels for the same restaurant but for alternative time intervals (e.g., as a bar chart). The user may determine which time interval of many time intervals best meets their needs for that particular restaurant.

In some embodiments, the capacity analysis computing device is configured to account for a type of the restaurant in order to select a similar historical time interval. More particularly, the capacity analysis computing device applies an offset to the selected time interval based on the restaurant type. Restaurants may be broadly separated into two types: eat-then-pay, which represents "sit-down" restaurants, formal dining, etc.; and pay-then-eat, which represents fast food and some casual dining restaurants. Eat-then-pay type restaurants experience a delay or offset between when a party actually occupies a place in the restaurant (eating) and the transaction initiation for the meal (paying). Pay-then-eat type restaurants do not experience such a delay, as the transaction initiation precedes or accompanies the diners' occupancy. In one embodiment, the capacity analysis computing device receives and stores restaurant information from a merchant reporting computing device. The restaurant information may include, for example, opening times, closing times, restaurant dining style (which may also influence a determination of restaurant type), and restaurant amenities (e.g., attire expectations, whether alcohol is served, whether there is outdoor seating, vegetarian availability, parking options, take-out/delivery options, etc.). Merchant reporting computing devices may include, in some cases, computing devices associated with the restaurants. Merchant reporting computing devices may also include computing devices associated with third parties that collect this information from restaurants and make the information available to subscribers.

The capacity analysis computing device retrieves the opening time for the restaurant. Additionally, the capacity analysis computing device retrieves the historical transaction data for the period of time and determines a transaction time of a first transaction initiated at the restaurant for each day within the period of time (or for a plurality of days less than all of the days within the period of time). The capacity analysis computing device computes the difference between the opening time and the transaction time of the first transaction for each of these days, and subsequently computes an average difference. This average difference defines the offset for the restaurant. For example, the capacity analysis computing device determines, for a particular eat-then-pay restaurant, that there is an average of 45 minutes between the opening time and the transaction time of the first transaction. The capacity analysis computing device applies the determined offset to each historical time interval such that accurate comparisons between selected time intervals and historical time intervals may be made. For example, if a historical time interval is 6:00 PM-6:30 PM, the capacity analysis computing device will apply the 45-minute offset and offset the historical time interval to a time of 6:45 PM-7:15 PM. This historical time interval may then be identified as a similar historical time interval when a selected time interval of 6:45 PM-7:15 PM (or within a range of this time) is received.

Additionally, in certain embodiments, the capacity analysis computing device is configured to leverage location information to determine which restaurant(s) for which to perform the above-described analyses. For example, the capacity analysis computing device may use location information associated with the user computing device of the user to determine which restaurant(s) are within a particular radius of the user, and may retrieve historical transaction data for those restaurants to determine capacity levels therefor. The capacity analysis computing device may receive location information (e.g., GPS coordinates or a street address) from the user computing device. In some embodiments, the location information may be sent with a capacity level request transmitted from the user computing device to the capacity analysis computing device from within the app. The location information may be automatically attached to the capacity level request. For example, the user computing device may automatically attach GPS coordinates or a street address to be transmitted with the capacity level request. The capacity analysis computing device may use received location data to provide capacity levels for restaurants within a particular radius of the user. As another example, the location information may be manually entered and attached by the user. In situations in which the user is interested in receiving capacity level information about restaurants in a location different from where the user computing device is currently located, the user of the user computing device may enter a particular location (e.g., street address, zip code, neighborhood, GPS coordinates, etc.). That location information will then be attached to the capacity level request.

Further, in some embodiments, the capacity analysis computing device may perform additional functions in response to a user selecting an optimal (e.g., most preferred by the user) restaurant and time interval after being presented with the results from the capacity analysis computing device. For example, in one embodiment, the capacity analysis computing device is configured to set a reservation for the user at the selected time interval and restaurant. The capacity analysis computing device may communicate with one or more merchant computing devices or reservation computing devices associated with the restaurant to request the reservation for the user. If no reservation is available (e.g., reservations are not taken at that restaurant or the reservation list is full for the selected time interval), the capacity analysis computing device is configured to transmit an alert to the user computing device that the optimal selected time interval is not available for that restaurant. The capacity analysis computing device may transmit alternative selections in the alert, such as a next-least-crowded time interval and/or a nearby restaurant. If the reservation is available, the capacity analysis computing device may confirm the reservation and/or transmit a request to the user computing device prompting the user to confirm the reservation.

Additionally or alternatively, the capacity analysis computing device may leverage the received location information to transmit navigation instructions to the user computing device from the user computing device's current location (e.g., at the time the current capacity level is sent to the user computing device and/or at the time the navigation instructions are requested) to the restaurant. The capacity analysis computing device may include and/or communicate with a navigation module configured to use, for example, GPS signals to navigate the user to the restaurant.

The systems and methods disclosed herein facilitate determining a current capacity level of a restaurant without requiring any real-time input from a merchant (restaurant) device. In fact, the current capacity level may be determined without any direct input from the merchant at all, which reduces or eliminates the need for additional infrastructure, networking, and/or communication capability between a merchant device and the capacity analysis computing device. Moreover, the systems and methods herein improve data security associated with the use of transaction data to facilitate such determinations. In some embodiments, wherein the capacity analysis computing device is associated with or integral to a payment processing network, the historical transaction data is not communicated outside the network. Even in embodiments in which the capacity analysis computing device is not associated with the payment processing network, no personally identifiable information from any historical transaction is transmitted to the capacity analysis computing device. Furthermore, reducing or eliminating the need for any added direct communication with a merchant device outside of the typical transaction processing reduces the risk of corruption or breach of any other data at the merchant device. At least one of the technical problems addressed by this system includes: (i) additional infrastructure for communication with a merchant to determine capacity levels of the merchant; (ii) resulting vulnerability of the merchant computing device; (iii) requiring real-time and/or continual communication with a merchant device to retrieve real-time and/or historical transaction data therefrom, thereby decreasing processing speeds and increasing network load; and/or (iv) reliance on anecdotal evidence for determinations of merchant capacity levels.

A technical effect of the systems and processes described herein is achieved by performing at least one of the following steps: (i) storing, in a memory, historical transaction data for a restaurant for a period of time; (ii) analyzing the historical transaction data for the restaurant to identify a maximum restaurant capacity for the restaurant over at least a portion of the period of time; (iii) receiving a selected time interval for which a current capacity level is to be determined, wherein a capacity level represents a restaurant occupancy relative to the maximum restaurant capacity; (iv) identifying a similar historical time interval to the selected time interval, the similar historical time interval occurring within the period of time; (v) determining a historical capacity level for the restaurant during the similar historical time interval using the historical transaction data corresponding to the similar historical time interval; (vi) assigning the historical capacity level as the current capacity level for the restaurant; and (vii) displaying the current capacity level on a user interface.

The technical effect achieved by this system is at least one of: (i) improved speed and/or throughput of processing requests due to the pre-processing of historical transaction data; (ii) elimination of the need for additional infrastructure to retrieve and process relevant transaction data; (iii) elimination of additional security risk and/or vulnerability that results from requiring access to merchant devices; and (iv) improved accuracy and precision in capacity level determination.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," "payment card," and "payment device" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), wearable computing devices, key fobs, digital wallets, and/or computers. Each type of transactions card can be used as a method of payment for performing a transaction. As used herein, the term "payment account" is used generally to refer to the underlying account with the payment device. In addition, account-holder behavior can include but is not limited to purchases, management activities (e.g., balance checking), bill payments, achievement of targets (meeting account balance goals, paying bills on time), and/or product registrations (e.g., mobile application downloads).

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a simplified block diagram of an example merchant analytics system 100 for determining a restaurant capacity level using a capacity analysis computing device 102. Capacity analysis computing device 102 may include one or more computing devices specifically programmed to perform the functions described further herein. In the example embodiment, capacity analysis computing device 102 is in communication with a database 106, which contains information on a variety of matters, as described below in greater detail. In one embodiment, centralized database 106 is stored on capacity analysis computing device 102. In an alternative embodiment, database 106 is stored remotely from capacity analysis computing device 102 and may be non-centralized. Database 106 may include a single database having separated sections or partitions or may include multiple databases, each being separate from each other. Database 106, in the example embodiment, includes a transaction database associated with and/or integral to a payment processor and/or payment processing network (not shown).

In a typical transaction processing system, a financial institution called the "issuer" issues a transaction card, such as a credit card, to a consumer or cardholder, who uses the transaction card to tender payment for a purchase from a merchant. To accept payment with the transaction card, the merchant must normally establish an account with a financial institution that is part of the financial payment system. This financial institution is usually called the "merchant bank," the "acquiring bank," or the "acquirer." When the cardholder tenders payment for a purchase with a transaction card, the merchant requests authorization from a merchant bank for the amount of the purchase, for example, by receiving account information associated with the cardholder and communicating the account information to the merchant bank. Using the payment processor, the merchant will communicate with the issuer bank to determine whether the cardholder's account is in good standing and whether the purchase is covered by the cardholder's available credit line. Based on these determinations, the request for authorization will be declined or accepted. If a request for authorization is accepted, the available credit line of the cardholder's account is decreased. If the cardholder uses a debit card, the available funds in the cardholder's account will be decreased. The payment processor may store the transaction card information, such as a type of merchant, amount of purchase, date of purchase, in database 106.

After a purchase has been made, a clearing process occurs to transfer additional transaction data related to the purchase among the parties to the transaction. More specifically, during and/or after the clearing process, additional data, such as a time of purchase, a merchant name, a type of merchant, purchase information, account-holder account information, a type of transaction, savings information, information regarding the purchased item and/or service, and/or other suitable information, is associated with a transaction and transmitted between parties to the transaction as transaction data. The payment processor may store the transaction data in database 106. As described herein, transaction data includes such elements as a transaction amount; a merchant identifier; an account identifier (associating the transaction with the cardholder); a time and date stamp; and a location identifier, which may identify where the transaction was initiated, a location of the cardholder at the time the transaction was initiated, and/or the location of the merchant (e.g., a merchant computing device such as a point-of-sale device). In some embodiments, transaction data may be stored in database 106 in an aggregated and/or anonymized format, such that no personally identifiable information is stored therein. Database 106 may additionally or alternatively store merchant data, weather data, other historical data associated with the transactions, and/or additional information as described herein.

Merchant analytics system 100 further includes a plurality of computing devices in communication with capacity analysis computing device 102, for example, via the Internet through many interfaces including a network 105, such as a local area network (LAN) or a wide area network (WAN), dial-in-connections, cable modems, special high-speed Integrated Services Digital Network (ISDN) lines, and RDT networks. More particularly, merchant analytics system 100 includes at least one user computing device 108, a merchant reporting computing device 110, and a weather reporting computing device 112.

User computing device 108 includes one or more computing devices associated with a user (not shown) interested in accessing the capacity analysis services of capacity analysis computing device 102. User computing device 108 may include any computing device such as a smart phone, laptop, desktop, tablet, wearable device (e.g., a "smart watch"), and/or any other computing device. User computing device 108 facilitates access to capacity analysis computing device 102 such that the user thereof may request and receive capacity level information.

Merchant reporting computing device 110 includes one or more computing devices associated with a merchant reporting service. More particularly, the merchant reporting service collects and provides information associated with merchants ("merchant data"), such as restaurants. Merchant data includes such data as opening and closing times, restaurant type (e.g., casual, fast food, etc.), restaurant cuisine (e.g., Italian, French, etc.), and restaurant features (e.g., outdoor dining, full bar, etc.). Merchant reporting computing devices 110 may include, in some cases, computing devices associated with restaurants. Merchant reporting computing devices 110 may also include computing devices associated with third parties that collect this information from restaurants and make the information available to subscribers (e.g., capacity analysis computing device 102).

Weather reporting computing device 112 includes one or more computing devices associated with a weather reporting service. More particularly, the weather reporting service collects and provides weather information, including current and historical weather information, associated with particular geographic areas at particular times.

Capacity analysis computing device 102 is configured to use historical transaction data, merchant reporting data, and/or weather reporting data to determine historical capacity levels for a restaurant. In some embodiments, as described further herein, capacity analysis computing device 102 is configured to retrieve historical transaction data associated with a past or historical period of time, for example, the past two years. Capacity analysis computing device 102 identifies a maximum capacity level from the historical transaction data over the period of time. Capacity analysis computing device 102 may then identify relative historical capacity levels over different historical time intervals, relative to the maximum capacity level.

Capacity analysis computing device 102 is further configured to receive a request (e.g., from user computing device 108) to output a current capacity level for the restaurant at a selected time interval. "Current capacity level," as used herein, refers to the capacity level associated with a selected time interval identified in the request from user computing device 108. If user computing device 108 requests substantially immediate or real-time capacity level of the restaurant (i.e., the request includes a selected time interval encompassing the time at which the request is made), the "current capacity level" refers to the capacity level literally at the current time. If user computing device 108 requests capacity level at an upcoming selected time interval (e.g., a request made at 12:00 PM requests capacity level at 6:00 PM), the "current capacity level" refers to the capacity level at that upcoming selected time interval. "Current capacity level" is used generally to cover both of these situations, as "current" is used to distinguish from "historical". Accordingly, "current" may cover real-time or immediate situations and/or "future" or upcoming situations.

Capacity level computing device 102 identifies a historical time interval similar to the selected time interval identified in the request (a "similar historical time interval"). As described further herein, capacity level computing device 102 identifies the similar historical time interval by identifying one or more characteristics of the selected time interval and determining a historical time interval that shares or best matches those one or more characteristics. Capacity level computing device 102 then assumes or infers that the current capacity level will substantially match the historical capacity level of the similar historical time interval, and assigns the historical capacity level as the current capacity level. Capacity level computing device 102 then outputs a report (e.g., as a data file or within an app or browser) including the current capacity level to user computing device 108 for review by a user thereof.

It should be understood that although the methods and systems disclosed herein are described with respect to the restaurants, the disclosure is readily applicable to other merchant types that may benefit from capacity information. For example, but without limitation, the methods and systems may be applicable to healthcare services (e.g., emergency rooms), governmental or bureaucratic services (e.g., a Department of Motor Vehicles office or Post Office), and/or any kind of merchant, service, or store.

Figure 2:
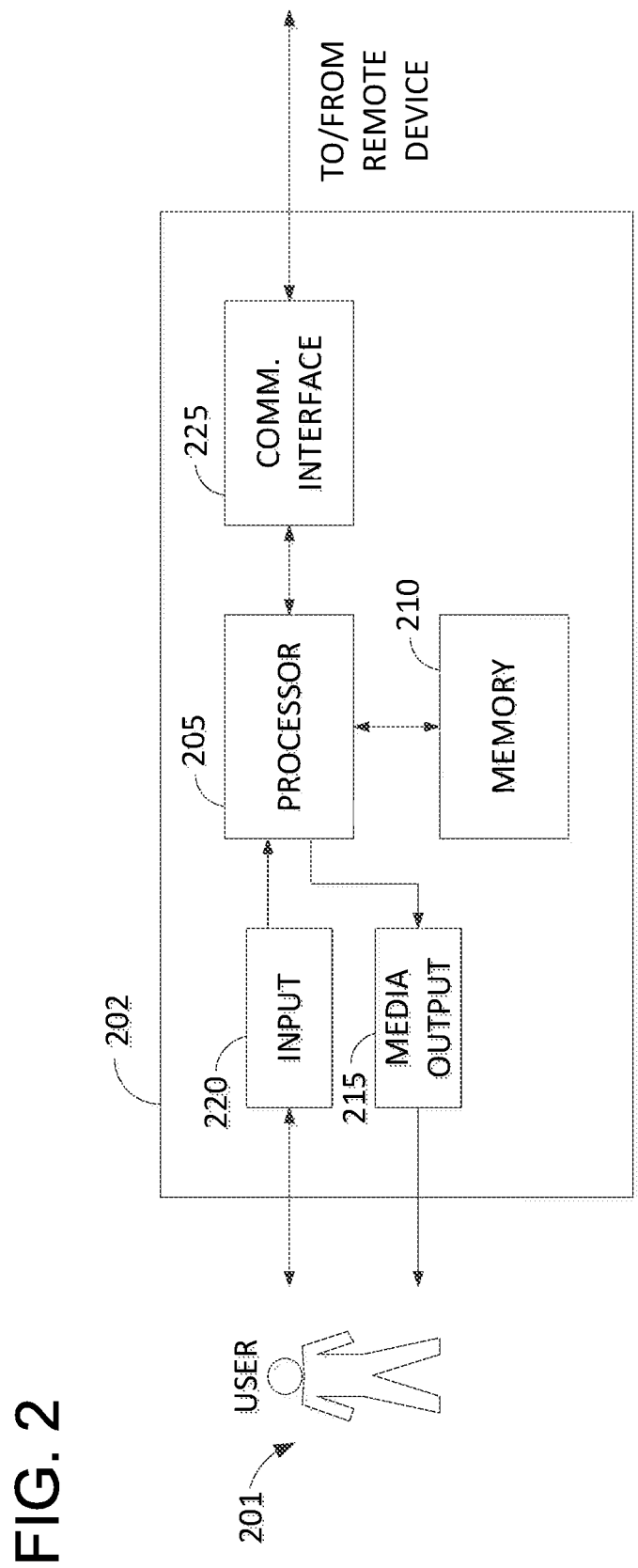

FIG. 2 illustrates an example configuration of a user system 202 operated by a user 201. In some embodiments, user system 202 includes user computing device 108 (shown in FIG. 1). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer-readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones. Stored in memory area 210 are, for example, computer readable instructions for providing a user interface to user 201 via media output component 215 and, optionally, receiving and processing input from input device 220.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Figure 3:
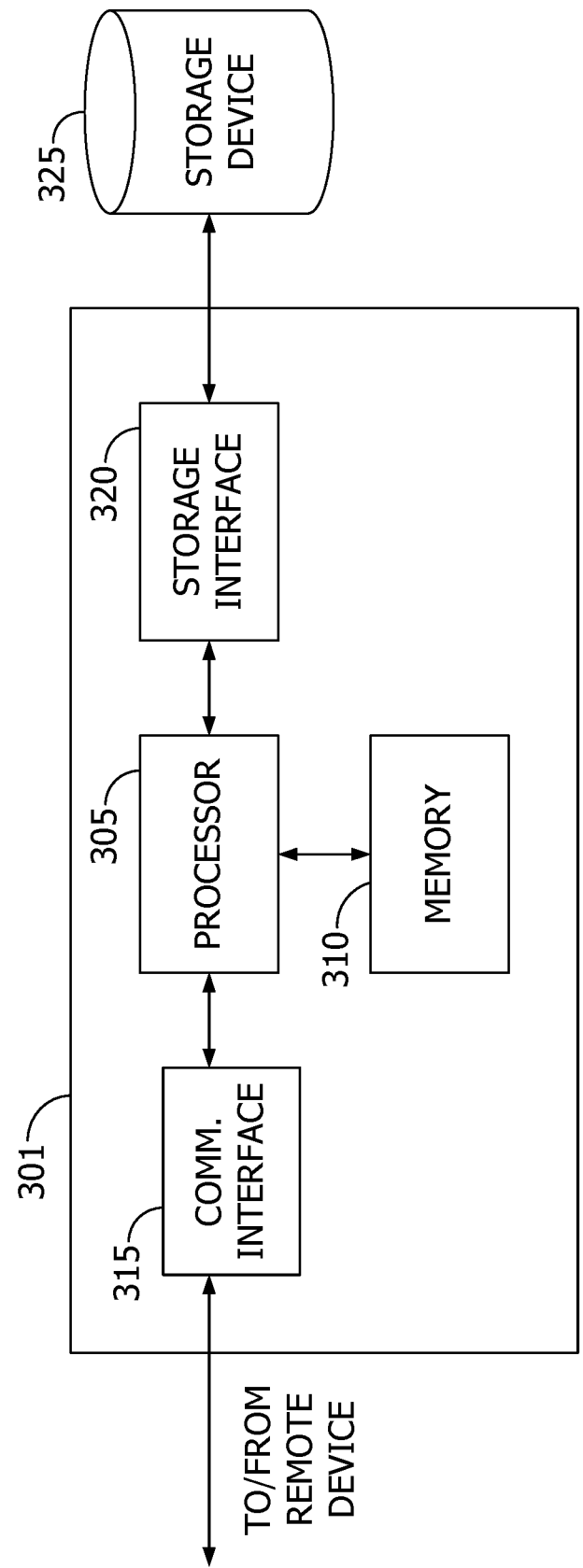

FIG. 3 illustrates an example configuration of a server system 301 used to determine capacity level for a restaurant, in accordance with one example embodiment of the present disclosure. In one embodiment, server system 301 may include capacity analysis computing device 102, merchant reporting computing device 110, and/or weather reporting computing device 112 (all shown in FIG. 1).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. Communication interface 315 may include, for example, a transceiver, a transmitter, a receiver, an Ethernet communication interface, an RS-485/EIA-485 communications interface, a GPIB communications interface, a Programmable Logic Controller (PLC), an RS-322 communication interface, and/or any other communication interface device and/or component. For example, communication interface 315 may receive requests (e.g., requests to provide an interactive user interface) from a client system 108 via the Internet, as illustrated in FIG. 1.

Processor 305 may also be operatively coupled to a storage device 325. Storage device 325 is any computer-operated hardware suitable for storing and/or retrieving data. In some embodiments, storage device 325 is integrated in server system 301. For example, server system 301 may include one or more hard disk drives as storage device 325. In other embodiments, storage device 325 is external to server system 301 and may be accessed by a plurality of server systems 301. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory area 310 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
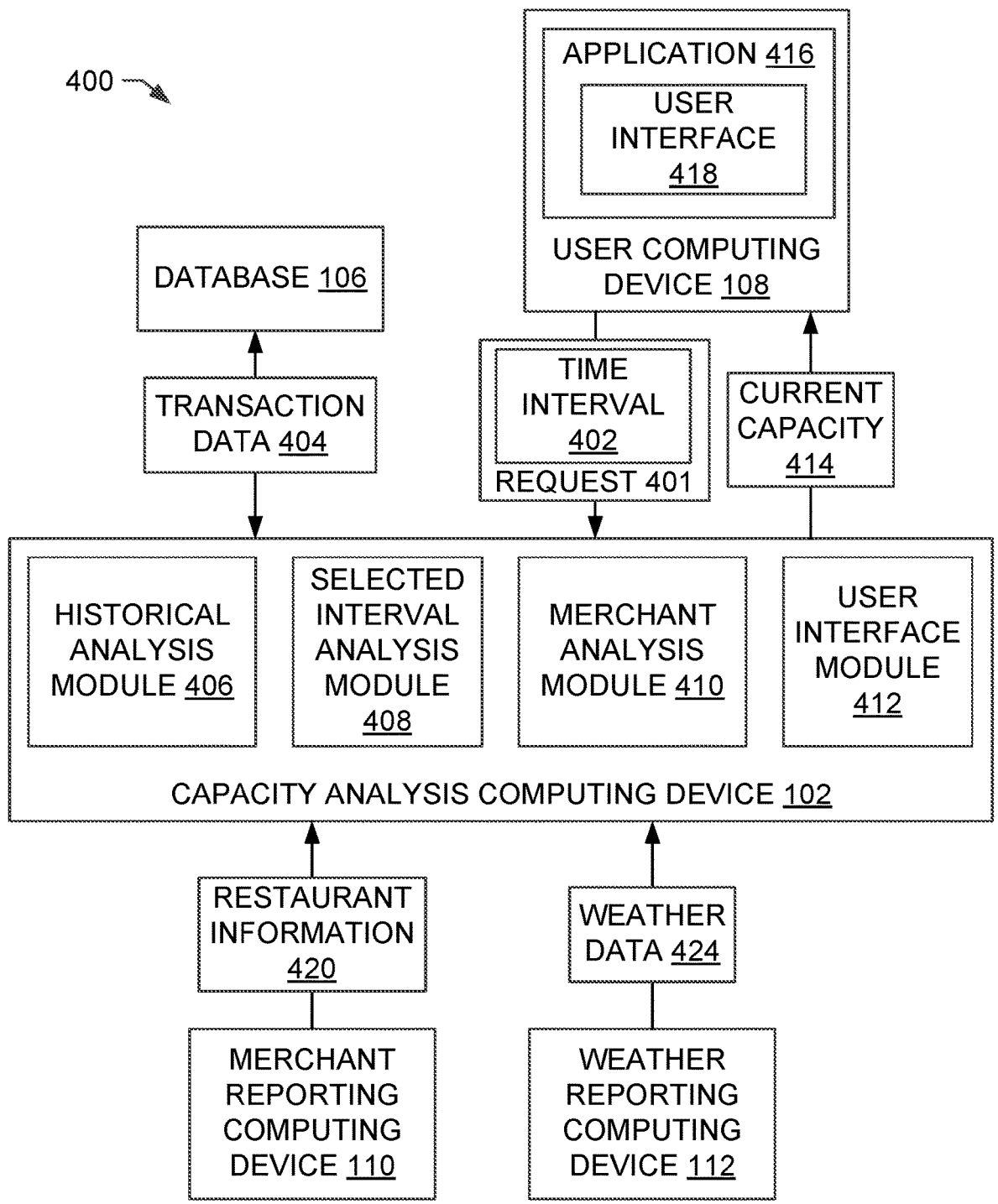

FIG. 4 is a data flow diagram 400 illustrating the flow of data between various components of merchant analytics system 100 (shown in FIG. 1). As shown in FIG. 1, capacity analysis computing device 102 is in communication with database 106, user computing device 108, merchant reporting computing device 110, and weather reporting computing device 112. It should be understood that capacity analysis computing device 102 may be in communication with fewer or more computing devices than illustrated in FIG. 4.

In the illustrated embodiment, capacity analysis computing device 102 includes a plurality of modules configured to execute specific functions. More specifically, capacity analysis computing device 102 includes a historical analysis module 406, a selected interval analysis module 408, a merchant analysis module 410, and a user interface module 412. Historical analysis module 406, a selected interval analysis module 408, a merchant analysis module 410, and a user interface module 412 may include computer-executable instructions implemented on a processor (e.g., processor 305, shown in FIG. 3) of capacity analysis computing device 102 to specifically execute the functions described herein.

User computing device 108 transmits a request 401 for a capacity level of a restaurant to capacity analysis computing device 102. Request 401 includes a selected time interval 402. Selected time interval 402 represents the time interval over which a user of user computing device 108 is interested in receiving capacity level information for the restaurant. In some cases, selected time interval 402 includes a time at which request 401 is transmitted to capacity analysis computing device. In other cases, selected time interval 402 includes a future or upcoming time interval. In still other cases, selected time interval 402 may include a plurality of time intervals. In such cases, the user of user computing device 108 may be interested in which time interval of the plurality of time intervals exhibits the lowest capacity level (i.e., the restaurant is the "least crowded"). In some embodiments, request 401 may identify more than one restaurant of interest. For example, request 401 may identify more than one specific restaurants and/or may identify a region of interest (e.g., a neighborhood or zip code), wherein the region of interest includes a plurality of restaurants. In such embodiments, the user of user computing device 108 may be interested in which restaurant exhibits the lowest capacity level (i.e., is the least crowded) at a specific selected time interval 402.

Capacity analysis computing device 102 receives request 401 including selected time interval 402. In one embodiment, receiving request 401 initiating the capacity analysis described herein, and one or more of the following steps are performed substantially in real time. In other embodiments, one or more of the following steps (e.g., offset calculation, determination of maximum capacity levels, etc.) are performed prior to receiving request 401, and the results of the steps are stored (e.g., in database 106) to make determination of a current capacity level 414 faster and/or more efficient.

Historical analysis module 406 is configured to retrieve historical transaction data 404 from database 106. In the example embodiment, historical analysis module 406 retrieves historical transaction data 404 associated with a particular period of time (e.g., the past two years, the past five years, etc.). The period of time should be long enough to cover a wide range of capacity levels but not too long that "outdated" data is used. Accordingly, two years may be a suitable period of time. Moreover, historical transaction data 404 is associated with transactions initiated at the restaurant(s) identified in request 401 over the period of time.

Historical analysis module 406 analyzes historical transaction data 404 to determine a maximum capacity level for the restaurant(s) identified in request 401. In one embodiment, historical analysis module identifies a top percentile (e.g., top 5%) of transaction velocity within historical transaction data 404 over the period of time. Transaction velocity represents a number of transactions initiated per unit time (e.g., 40 transactions per hour). Historical analysis module 406 then averages the top percentile transaction velocity (and/or performs alternative weighting functions thereon) and defines the maximum restaurant capacity as that average number of transactions per unit time. For example, historical analysis module 406 may define the maximum restaurant capacity as "40 transactions" (per unit time).

In some embodiments, historical analysis module 406 is further configured to request weather data 424 for the period of time (and/or for a particular division of the period of time, for example, one day or one week). Weather data 424 includes weather characteristics associated with particular places and times, for example, 1:00 PM in a particular zip code. Weather data 424 may be granular and provide hourly or even more specific temporal weather data for a particular place. Additionally or alternatively, weather data 424 may provide less granular data (e.g., daily weather data). Historical analysis module 406 parses weather data 424 and associates one or more weather characteristics with historical transaction data 404. For example, historical analysis module 406 may parse weather data 424 and historical transaction data 404 for the same particular two-hour interval on an evening in June for a zip code. Weather data 424 indicates that the weather over that time interval was about 80°, humid, overcast, and still (i.e., not windy). Historical analysis module 406 may associate one or more of those characteristics with the parsed historical transaction data 404 for that same interval. Historical analysis module 406 may perform this association process for all historical transaction data 404 within the period of time, such that any time interval within the period of time has weather data associated therewith. Historical analysis module 406 may additionally or alternatively perform a similar association process with other characteristics, such as season, day of the week, month of the year, and/or any other characteristic. In these embodiments, historical time intervals within the period of time may be associated with and/or indexed by (e.g., stored in database 106 and indexed by) any or all of these characteristics. Historical time intervals may then be searched (e.g., by historical analysis module 406 and/or selected interval analysis module 408) according to characteristics associated therewith.

Selected interval analysis module 408 receives, retrieves, and/or otherwise accesses selected time interval 402. Selected time interval 402, as described above, represents a time interval for which a current capacity level is to be determined. Selected interval analysis module 408 is configured to communicate with historical analysis module 406 to identify a similar historical time interval within the period of time for which a historical capacity level may be determined. In one embodiment, selected interval analysis module 408 is configured to determine one or more characteristics about selected time interval 402. These characteristics may include a time of day (e.g., the particular time interval or a more general "morning/afternoon/evening"), a day of the week (e.g., a particular day or a more general "weekday/weekend"), a month, a time of year or season, and/or any other suitable characteristic. Selected interval analysis module 408 may determine some intrinsic characteristics such as time or day using, for example, internal clocks, calendars, etc. Selected interval analysis module 408 may request weather data 424 from weather reporting computing device 112 to determine weather characteristics for selected time interval 402. In one embodiment, selected interval analysis module 408 transmits selected time interval 402 (e.g., Jan. 1, 2016, 2:00 PM-3:00 PM) to weather reporting computing device 112. Weather reporting computing device 112 then transmits weather data 424 associated with selected time interval 402 to capacity analysis computing device 102 for access by selected interval analysis module 408. Selected interval analysis module 408 parses weather data 424 to identify one or more weather characteristics of selected time interval 402.

Selected interval analysis module 408 communicates with historical analysis module 406 to identify a historical time interval sharing one or more characteristics with selected time interval 402 (a "similar historical time interval"). In some embodiments, selected interval analysis module 408 and/or historical analysis module 406 is configured to weight one or more characteristics more heavily when identifying the similar historical time interval. Additionally or alternatively, selected interval analysis module 408 and/or historical analysis module 406 is configured to define a particular number of characteristics that a historical time interval must share with selected time interval 402 in order to be identified as the similar historical time interval.

In certain embodiments, as described above, historical analysis module 406 has already indexed historical time intervals according to characteristics associated therewith, such that historical analysis module 406 may search historical time intervals with the identified characteristics of selected time interval 402 to identify the similar historical time interval. In other embodiments, historical analysis module 406 may index historical transaction data 404 only according to intrinsic characteristics, such as the time/day/month/season/etc. In such embodiments, selected interval analysis module 408 may identify weather characteristics for selected time interval 402, as described above, and may request weather reporting computing device 112 to transmit weather data 424 for historical time intervals sharing weather characteristics with selected time interval 402. Selected interval analysis module 408 may then identify those historical time intervals to historical analysis module 406. Historical analysis module 406 may retrieve historical transaction data 404 for those historical time intervals such that selected interval analysis module 408 may identify the most similar historical time interval, and may perform the capacity analysis described herein.

For example, if selected time interval 402 is Friday, Jan. 1, 2016, at 7:00 PM-8:00 PM, some intrinsic characteristics of selected interval 402 may include the time (7:00 PM-8:00 PM; dinner hours), the day (Friday; weekend), the month (January), the season (winter), and/or the holiday (e.g., non-holiday; holiday-adjacent). Weather characteristics (as determined using weather data 424) may include a temperature, temperature range, wind chill, and/or precipitation level, for example. Selected interval analysis module 408 may communicate these characteristics to historical analysis module 406. In this particular example, historical analysis module 406 is configured to weight some characteristics (e.g., weather characteristics, time, and day of the week) over other characteristics (e.g., month or season). Historical analysis module 406 accordingly may locate in database 106 a historical time interval of 7:00 PM-8:00 PM on Friday, Dec. 4, 2015, with similar weather characteristics (e.g., falling within the same temperature range and sharing precipitation level). Historical analysis module 406 may identify this particular historical time interval as the similar historical time interval, and may retrieve historical transaction data 404 (and/or already-determined capacity metrics previously performed using this same historical transaction data 404 and stored in database 106) for the similar historical time interval.

Once the similar historical time interval has been identified, historical analysis module 406 determines a historical capacity level for the restaurant over the similar historical time interval using historical transaction data 404 corresponding to the similar historical time interval. In one embodiment, historical analysis module 406 retrieves and processes historical transaction data 404 to determine the number of transactions initiated at the restaurant within the similar historical time interval. Historical analysis module 406 may divide the transaction count for the similar historical interval (e.g., 20 transactions) by the maximum capacity level (e.g., 40 transactions) to determine the historical capacity level (e.g., 50%). Historical analysis module 406 may perform such calculations when data is stored and/or retrieved. Alternatively, historical analysis module 406 may perform this (and/or any other calculation described herein) when a capacity level request is received (e.g., in "real-time").

Additionally or alternatively, historical analysis module 406 retrieves and processes historical transaction data 404 to determine an average transaction amount associated with the restaurant over the period of time. For example, historical analysis module 406 may determine that an average transaction amount for the restaurant is approximately $30. In some embodiments, historical analysis module 406 is configured to identify outlier transactions in historical transaction data 404, such as larger parties, and process these outlier transactions differently (e.g., divide larger transactions or weight larger transactions less in the average determination). Historical analysis module 406 then determines the number of transactions initiated at the restaurant within the similar historical time interval (if it has not already done so, as above). In addition, historical analysis module 406 determines a total transaction amount (i.e., a total dollar amount or value) of the number of transactions. For example, historical analysis module 406 may determine that 20 transactions were initiated within the similar historical time interval, the 20 transactions totaling $900. Historical analysis module 406 then determines an "adjusted number of transactions" by dividing the total transaction amount by the average transaction amount. The adjusted number of transactions is calculated to account for whether the restaurant is occupied by generally smaller parties, average parties, or generally larger parties. Continuing with the above example, historical analysis module 406 would determine the adjusted number of transactions as $900/$30=30 (which may mean that the parties at the restaurant during this similar historical time interval are larger than average). Historical analysis module 406 then determines the historical capacity level during this similar historical interval by dividing the adjusted number of transactions by the maximum restaurant capacity. Again continuing with the same example, historical analysis module 406 determines the historical capacity level as 30/40=75%. Historical analysis module 406 may perform such calculations when data is stored and/or retrieved. Alternatively, historical analysis module 406 may perform this (and/or any other calculation described herein) when a capacity level request is received (e.g., in "real-time").

Historical analysis module 406 then communicates the historical capacity level for the similar historical time interval to selected interval analysis module 408. Selected interval analysis module 408 applies the historical capacity level to a current capacity level 414, "assuming" or inferring that for time intervals with one or more shared key characteristics, the capacity level for the restaurant will be similar.

In some embodiments, selected interval analysis module 408 and/or historical analysis module 406 are configured to account for a type of the restaurant in order to select a similar historical time interval. More particularly selected interval analysis module 408 applies an offset to selected time interval 402 based on the restaurant type. Restaurants may be broadly separated into two types: eat-then-pay, which represents "sit-down" restaurants, formal dining, etc.; and pay-then-eat, which represents fast food and some casual dining restaurants. Eat-then-pay type restaurants experience a delay or offset between with a party actually occupies a place in the restaurant (eating) and the transaction initiation for the meal (paying). Pay-then-eat type restaurants do not experience such a delay, as the transaction initiation precedes or accompanies the diners' occupancy.

In one embodiment, merchant analysis module 410 receives and stores restaurant information 420 from merchant reporting computing device 110. Restaurant information 420 may include, for example, opening times, closing times, restaurant dining style (which may also influence a determination of restaurant type), and restaurant amenities (e.g., attire expectations, whether alcohol is served, whether there is outdoor seating, vegetarian availability, parking options, take-out/delivery options, etc.). Merchant analysis module 410 retrieves an opening time for the restaurant. Additionally, merchant analysis module 410 retrieves historical transaction data 404 for the period of time and determines a transaction time of a first transaction initiated at the restaurant for each day within the period of time (or for a plurality of days less than all of the days within the period of time). Merchant analysis module 410 computes the difference between the opening time and the transaction time of the first transaction for each of these days, and subsequently computes an average difference. This average difference defines the offset for the restaurant. For example, merchant analysis module 410 determines, for a particular eat-then-pay restaurant, that there is an average of 45 minutes between the opening time and the transaction time of the first transaction.

Merchant analysis module 410 has therefore determined that the offset for that example restaurant is 45 minutes. Merchant analysis module 410 may store a table or other data format associating determined offsets with respective restaurants (e.g., in database 106). Merchant analysis module 410 transmits an indication of the offset of a particular restaurant to historical analysis module 406. Historical analysis module 406 applies the determined offset to each historical time interval such that accurate comparisons between selected time intervals and historical time intervals may be made. For example, if a historical time interval is 6:00 PM-6:30 PM, historical analysis module 406 will apply the 45-minute offset and offset the historical time interval to a time of 6:45 PM-7:15 PM. This historical time interval may then be identified as a similar historical time interval when a selected time interval of 6:45 PM-7:15 PM (or within a range of this time) is received.

Additionally, in certain embodiments, merchant analysis module 410 is configured to leverage location information to determine which restaurant(s) for which to perform the above-described capacity level analyses. For example merchant analysis module 410 may use location information associated with user computing device 108 to determine which restaurant(s) are within a particular radius of user computing device 108. Merchant analysis module 410 may then direct selected interval analysis module 408 and/or historical analysis module 406 to retrieve historical transaction data 404 for those restaurants to determine capacity levels therefor. Merchant analysis module 410 may receive location information (e.g., GPS coordinates or a street address) from user computing device 108. In some embodiments, the location information may be sent with request 401. The location information may be automatically attached to request 401. For example, user computing device 108 may automatically attach GPS coordinates or a street address to be transmitted with capacity level request 401. Merchant analysis module 410 may use received location data to provide capacity levels for restaurants within a particular radius of the user. As another example, the location information may be manually entered and attached by the user. In situations in which the user is interested in receiving capacity level information about restaurants in a location different from where user computing device 108 is currently located, the user of user computing device 108 may enter a particular location (e.g., street address, zip code, neighborhood, GPS coordinates, etc.). That location information will then be attached to capacity level request 401.

User interface module 412 is configured to facilitate display of a user interface 418 within a software application ("app") 416 at user computing device 108. In some embodiments, user interface module 412 includes an application programming interface (API) such that a plurality of user computing device 108 may communicate with capacity analysis computing device 102. User interface module 412 additionally prepares current capacity level 414 for transmission to user computing device 108 and display at user interface 418. User interface module 412 transmits a signal to user computing device 108, the signal including instructions to display current capacity level 414 to user interface 418 within app 416. In some embodiments, user interface module 412 prepares current capacity level 414 for one restaurant for display to similarly determined current capacity levels 414 for alternative restaurants (e.g., as a bar chart). The user of user computing device 108 may determine which restaurant of many restaurants best meets their needs at selected time interval 402. In some embodiments, user interface module 412 prepares current capacity level 414 for the restaurant and one selected time interval 402 to be displayed relative to current capacity levels 414 for the same restaurant but for alternative time intervals (e.g., as a bar chart). The user may determine which time interval of many time intervals best meets their needs for that particular restaurant.

User interface module 412 may be further configured to present at user interface 418 a request screen for the user of user computing device 108 to prepare and submit request 401. The request screen may prompt and/or enable the user to enter various data, such as one or more selected time interval 402, a restaurant name, and/or a location or region of interest. User interface module 412 may additionally present a "results" screen to display to the user the results, as described above. The results screen may include various options and/or commands to display the results in one or more formats (e.g., toggle between "many restaurants, same time" and "one restaurant, many times"; display as a bar chart, in a text format, in a plot, etc.), with one or more filters (e.g., distance from a current location, restaurant type, restaurant features, etc.), and/or any other suitable option or command.

Further, in some embodiments, capacity analysis computing device 102 may perform additional functions in response to a user selecting an optimal (e.g., most preferred by the user) restaurant and time interval within user interface 418. For example, in one embodiment, capacity analysis computing device 102 includes a reservation module (not shown) configured to set a reservation for the user at the optimal time interval and restaurant. The reservation module may communicate with one or more merchant computing devices or reservation computing devices (not shown) associated with the restaurant to request the reservation for the user. If no reservation is available (e.g., reservations are not taken at that restaurant or the reservation list is full for the selected time interval), the reservation module is configured to instruct user interface module 412 transmit an alert to user interface 418 that the optimal time interval is not available for that restaurant. The reservation module may additionally instruct user interface module 412 to transmit alternative selections in the alert, such as a next-least-crowded time interval and/or a nearby restaurant. If the reservation is available, the reservation module may confirm the reservation and/or instruct user interface module 412 to transmit a request to user computing device 108 prompting the user to confirm the reservation within application 416.

Additionally or alternatively, capacity analysis computing device 102 may leverage the received location information to use user interface module 412 to transmit navigation instructions to user interface 418 from user computing device's 108 current location (e.g., at the time the current capacity level 414 is sent to user computing device 108 and/or at the time the navigation instructions are requested) to the restaurant. Capacity analysis computing device 102 may include and/or communicate with a navigation module (not shown) configured to use, for example, GPS signals to navigate the user to the restaurant.

Figure 5:
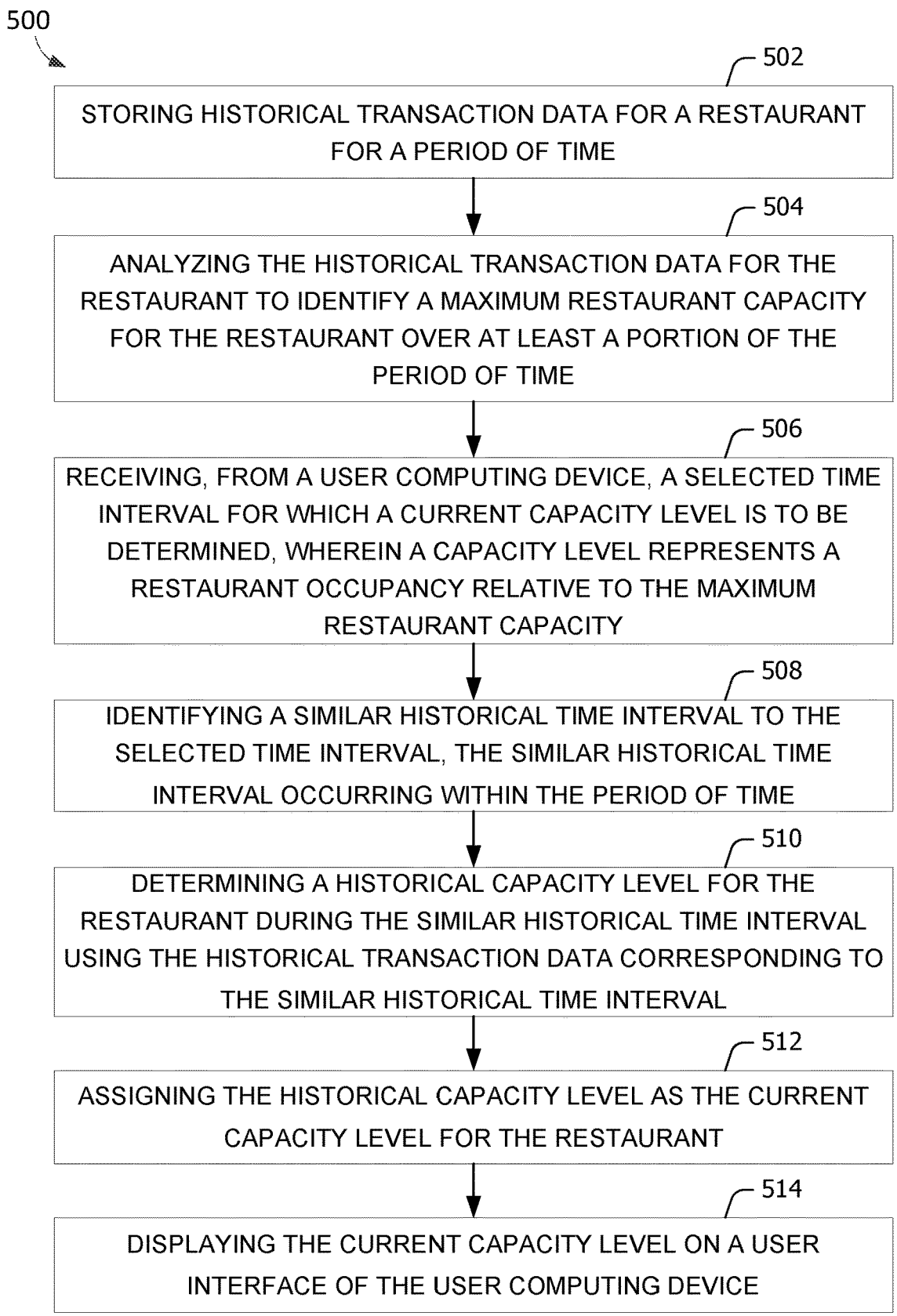

FIG. 5 is an example method 500 for determining restaurant capacity level. In the example embodiment, method 500 is performed by a computing system such as capacity analysis computing device 102 (shown in FIG. 1). Method 500 includes storing 502 historical transaction data (e.g., historical transaction data 404, shown in FIG. 4) for a restaurant for a period of time. Historical transaction data may be story in a memory device, such as database 106 (shown in FIG. 1) and/or memory device 310 (shown in FIG. 3). Method 500 also includes analyzing 504 the historical transaction data for the restaurant to identify a maximum restaurant capacity for the restaurant over at least a portion of the period of time.

Method 500 further includes receiving 506 a selected time interval (e.g., time interval 402) for which a current capacity level (e.g., current capacity level 414, both shown in FIG. 4) is to be determined. "Capacity level" represents a restaurant occupancy relative to the maximum restaurant capacity. The selected time interval is received 506, in the example embodiment, from a user computing device (e.g., user computing device 108, shown in FIG. 1) in communication with the capacity analysis computing device. Method 500 also includes identifying 508 a similar historical time interval to the selected time interval. The similar historical time interval occurs within the period of time.

Method 500 still further includes determining 510 a historical capacity level for the restaurant during the similar historical time interval using the historical transaction data corresponding to the similar historical time interval, and assigning 512 the historical capacity level as the current capacity level for the restaurant. Method 500 also includes displaying 514 the current capacity level on a user interface (e.g., user interface 418, shown in FIG. 4) of the user computing device. It should be understood that "displaying" 514 includes, in various embodiments, transmitting for display, causing display of, actively or directly displaying, and/or any alternative thereto.

Figure 6:
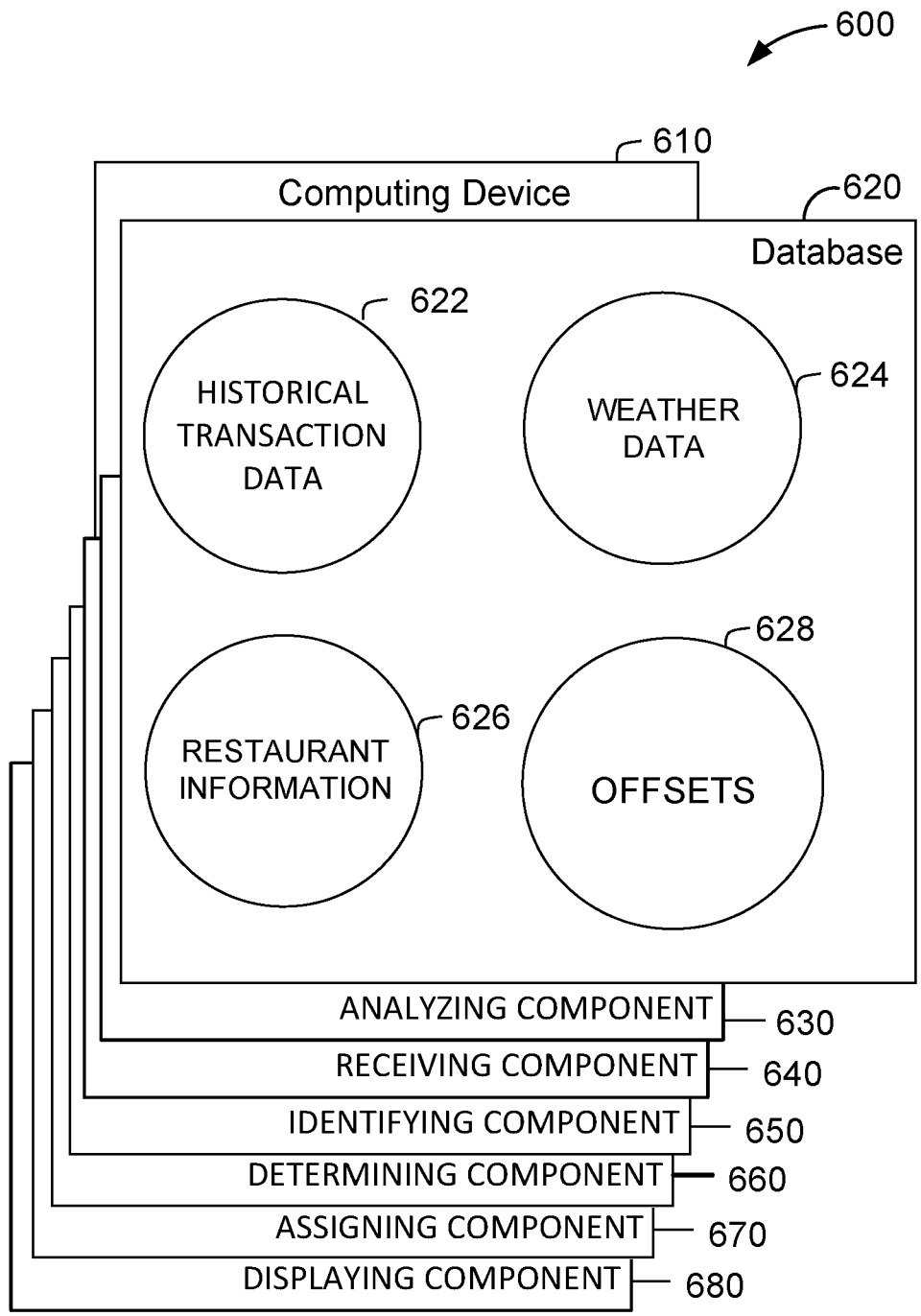

FIG. 6 shows a diagram of components 600 of an example computing device 610 that may be used in merchant analytics system 100 shown in FIG. 1 to determine restaurant capacity level using historical transaction data. In some embodiments, computing device 610 is similar to capacity analysis computing device 102 (shown in FIG. 1). Computing device 610 includes a database 620, which may be similar to database 106 (shown in FIG. 1) and is configured to store information. In the illustrated embodiment, database 620 stores (by way of example and not limitation) historical transaction data 622, weather data 624, restaurant information 626, and offsets 628. Database 620 is coupled to several separate components within computing device 610, which perform specific tasks.

Specifically, computing device 610 includes an analyzing component 630 configured to analyze historical transaction data 622 for the restaurant to identify a maximum restaurant capacity for the restaurant over at least a portion of the period of time. Computing device 610 also includes a receiving component 640 configured to receive a selected time interval for which a current capacity level is to be determined. "Capacity level" represents a restaurant occupancy relative to the maximum restaurant capacity. In the example embodiment, the selected time interval is received from a user computing device in communication with computing device 610.

Computing device 610 further includes an identifying component 650 configured to identify a similar historical time interval to the selected time interval. The similar historical time interval occurs within the period of time. Computing device 610 also includes a determining component 660 configured to determine a historical capacity level for the restaurant during the similar historical time interval using historical transaction data 622 corresponding to the similar historical time interval. Additionally, computing device 610 includes an assigning component 670 configured to assign the historical capacity level as the current capacity level for the restaurant, and a displaying component 680 configured to display (e.g., transmit for display, cause display of, directly display, etc.) the current capacity level on a user interface of the user computing device.

It should be understood that in alternative embodiments, two or more of components 630-680 may be implemented as a single components. For example, identifying component 650 and determining component 660 may be implemented as a single component.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

In addition, although various elements of the capacity analysis computing device are described herein as including general processing and memory devices, it should be understood that the capacity analysis computing device is a specialized computer configured to perform the steps described herein for determining a restaurant capacity level.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A capacity analysis computing device for determining a restaurant capacity level for a restaurant, the capacity analysis computing device in communication with a payment processor of a payment processing network and including a processor in communication with a memory, said processor programmed to:

retrieve, from the payment processor, historical transaction data for the restaurant for a period of time, wherein the historical transaction data includes a plurality of transactions initiated by a respective plurality of cardholders with a restaurant merchant associated with the restaurant over a period of time, the plurality of transactions processed over the payment processing network;

store, in the memory, the historical transaction data;

analyze the historical transaction data for the restaurant to identify a maximum restaurant capacity for the restaurant over at least a portion of the period of time;

receive, from an application executing on a user computing device via the Internet, a request message including a selected time interval for which a current capacity level is to be determined, wherein a capacity level represents a restaurant occupancy relative to the maximum restaurant capacity;

identify a similar historical time interval to the selected time interval, the similar historical time interval occurring within the period of time;

determine a historical capacity level for the restaurant during the similar historical time interval using the historical transaction data corresponding to the similar historical time interval;

assign the historical capacity level as the current capacity level for the restaurant such that the current capacity level is determined without direct input from the restaurant merchant;

cause the application executing on the user computing device to display the current capacity level for the restaurant on a user interface of the user computing device as well as one of (i) the current capacity level for the restaurant relative a respective current capacity level for at least one alternative restaurant for the selected time interval, or (ii) the current capacity level for the restaurant for the selected time relative to a capacity level for the restaurant for at least one alternative time interval;

receive a first user input on the user interface of the user computing device, the first user input including user selection of a display content command; and in response to the first user input, cause the application executing on the user computing device to display the other of (i) the current capacity level for the restaurant relative the respective current capacity level for the at least one alternative restaurant for the selected time interval, or (ii) the current capacity level for the restaurant for the selected time relative to the capacity level for the restaurant for the at least one alternative time interval.

2. The capacity analysis computing device of claim 1, wherein said processor is further programmed to:
identify a top percentile of transaction velocities over the period of time, wherein transaction velocity represents a number of transactions initiated at the restaurant per unit time; and
define an average of the top percentile transaction velocity as the maximum restaurant capacity.

3. The capacity analysis computing device of claim 1, wherein said processor is further programmed to receive a plurality of selected time intervals from the application executing on the user computing device in communication with the capacity analysis computing device.

4. The capacity analysis computing device of claim 1, wherein said process is further programmed to:
determine at least one of a time of day, day of week, time of year, holiday, month, season, and weather associated with the selected time interval; and
identify the similar historical time interval as having the at least one of the time of day, day of week, time of year, holiday, month, season, and weather similar to the selected time interval; and
retrieve historical transaction data for the similar historical time interval.

5. The capacity analysis computing device of claim 4, wherein said processor is further programmed to:
receive weather data associated with the selected time interval from a weather reporting computing device;
identify at least one weather characteristic for the selected time interval from the received weather data;
receive historical weather data for the period of time; and
identify the similar historical time interval sharing the identified at least one weather characteristic.

6. The capacity analysis computing device of claim 1, wherein said processor is further programmed to:
determine a number of transactions initiated within the similar historical interval; and
calculate the historical capacity level by dividing the number of transactions by the maximum restaurant capacity.

7. The capacity analysis computing device of claim 1, wherein said processor is further programmed to:
calculate an average transaction amount associated with the restaurant using the historical transaction data;
determine a number of transactions initiated within the similar historical interval;

calculate a total transaction amount of the number of transactions initiated within the similar historical interval;
calculate an adjusted number of transactions by dividing the total transaction amount by the average transaction amount; and
calculate the historical capacity level by dividing the adjusted number of transactions by the maximum restaurant capacity.

8. The capacity analysis computing device of claim 1, wherein said processor is further programmed to apply an offset to the selected time interval based on a restaurant type associated with the restaurant.

9. The capacity analysis computing device of claim 8, wherein said processor is further programmed to:
retrieve an opening time associated with the restaurant;
determine a transaction time of a first transaction initiated at the restaurant on a plurality of days within the period of time; and
calculate the offset by determining the average difference between the opening time and the transaction time of the first transaction initiated at the restaurant.

10. The capacity analysis computing device of claim 1, wherein said processor is further programmed to:
receive location information including GPS coordinates from the user computing device;
determine, using the GPS coordinates, a location of the user computing device; and
cause display, on the user interface, of capacity levels for one or more alternative restaurants within a selected radius of location of the user computing device.

11. The capacity analysis computing device of claim 10, wherein said processor is further programmed to:
in response to a user selection of the restaurant or one of the alternative restaurants, cause display, on the user interface, of navigation instructions to the selected one of the restaurant or one of the alternative restaurants.

12. The capacity analysis computing device of claim 1, wherein said processor is further programmed to:
receive a second user input on the user interface of the user computing device, the second user input including user selection of a display format command; and
in response to the second user input, cause the application executing on the user computing device to change the display format of displayed data from one of bar charts, text format, and plots, to another of bar charts, text format, and plots.

13. A computer-implemented method for determining a restaurant capacity level for a restaurant using a capacity analysis computing device, the capacity analysis computing device in communication with a payment processor of a payment processing network and including a processor in communication with a memory, said method comprising:
retrieving, from the payment processor, historical transaction data for the restaurant for a period of time, wherein the historical transaction data includes a plurality of transactions initiated by a respective plurality of cardholders with a restaurant merchant associated with the restaurant over a period of time, the plurality of transactions processed over the payment processing network;
storing, in the memory, the historical transaction data;
analyzing the historical transaction data for the restaurant to identify a maximum restaurant capacity for the restaurant over at least a portion of the period of time;
receiving, from an application executing on a user computing device via the Internet, a request message including a selected time interval for which a current capacity level is to be determined, wherein a capacity level represents a restaurant occupancy relative to the maximum restaurant capacity;

identifying a similar historical time interval to the selected time interval, the similar historical time interval occurring within the period of time;

determining a historical capacity level for the restaurant during the similar historical time interval using the historical transaction data corresponding to the similar historical time interval;

assigning the historical capacity level as the current capacity level for the restaurant such that the current capacity level is determined without direct input from the restaurant merchant;

causing the application executing on the user computing device to display the current capacity level for the restaurant on a user interface of the user computing device as well as one of (i) the current capacity level for the restaurant relative a respective current capacity level for at least one alternative restaurant for the selected time interval, or (ii) the current capacity level for the restaurant for the selected time relative to a capacity level for the restaurant for at least one alternative time interval;

receiving a first user input on the user interface of the user computing device, the first user input including user selection of a display content command; and in response to the first user input, causing the application executing on the user computing device to display the other of (i) the current capacity level for the restaurant relative the respective current capacity level for the at least one alternative restaurant for the selected time interval, or (ii) the current capacity level for the restaurant for the selected time relative to the capacity level for the restaurant for the at least one alternative time interval.

14. The computer-implemented method of claim 13 further comprising:

identifying a top percentile of transaction velocities over the period of time, wherein transaction velocity represents a number of transactions initiated at the restaurant per unit time; and defining an average of the top percentile transaction velocity as the maximum restaurant capacity.

15. The computer-implemented method of claim 13, further comprising receiving a plurality of selected time intervals in the request message.

16. The computer-implemented method of claim 13 further comprising:

determining at least one of a time of day, day of week, time of year, holiday, month, season, and weather associated with the selected time interval;

identifying the similar historical time interval as having the at least one of the time of day, day of week, time of year, holiday, month, season, and weather similar to the selected time interval; and retrieving historical transaction data for the similar historical time interval.

17. The computer-implemented method of claim 13 further comprising:

determining a number of transactions initiated within the similar historical interval; and calculating the historical capacity level by dividing the number of transactions by the maximum restaurant capacity.

18. The computer-implemented method of claim 17 further comprising:

calculating an average transaction amount associated with the restaurant using the historical transaction data;

calculating a total transaction amount of the number of transactions initiated within the similar historical interval;

calculating an adjusted number of transactions by dividing the total transaction amount by the average transaction amount; and calculating the historical capacity level by dividing the adjusted number of transactions by the maximum restaurant capacity.

19. The computer-implemented method of claim 13 further comprising applying an offset to the selected time interval based on a restaurant type associated with the restaurant.

20. The computer-implemented method of claim 19 further comprising:

retrieving an opening time associated with the restaurant;

determining a transaction time of a first transaction initiated at the restaurant on a plurality of days within the period of time; and calculating the offset by determining the average difference between the opening time and the transaction time of the first transaction initiated at the restaurant.

21. At least one non-transitory computer-readable storage media having computer-executable instructions embodied thereon, wherein when executed by at least one processor in communication with a memory, the computer-executable instructions cause the processor to:

retrieve, from a payment processor, historical transaction data for a restaurant for a period of time, wherein the historical transaction data includes a plurality of transactions initiated by a respective plurality of cardholders with a restaurant merchant associated with a restaurant over a period of time, the plurality of transactions processed over a payment processing network;

store, in the memory, the historical transaction data;

analyze the historical transaction data for the restaurant to identify a maximum restaurant capacity for the restaurant over at least a portion of the period of time;

receive, from an application executing on a user computing device via the Internet, a request message including a selected time interval for which a current capacity level is to be determined, wherein a capacity level represents a restaurant occupancy relative to the maximum restaurant capacity;

identify a similar historical time interval to the selected time interval, the similar historical time interval occurring within the period of time;

determine a historical capacity level for the restaurant during the similar historical time interval using the historical transaction data corresponding to the similar historical time interval;

assign the historical capacity level as the current capacity level for the restaurant such that the current capacity level is determined without direct input from the restaurant merchant;

cause the application executing on the user computing device to display the current capacity level for the restaurant on a user interface of the user computing device as well as one of (i) the current capacity level for the restaurant relative a respective current capacity level for at least one alternative restaurant for the selected time interval, or (ii) the current capacity level for the restaurant for the selected time relative to a capacity level for the restaurant for at least one alternative time interval;

receive a first user input on the user interface of the user computing device, the first user input including user selection of a display content command; and in response to the first user input, cause the application executing on the user computing device to display the other of (i) the current capacity level for the restaurant relative the respective current capacity level for the at least one alternative restaurant for the selected time interval, or (ii) the current capacity level for the restaurant for the selected time relative to the capacity level for the restaurant for the at least one alternative time interval.

22. The at least one non-transitory computer-readable storage media of claim 21, wherein the computer-executable instructions further cause the processor to:

identify a top percentile of transaction velocities over the period of time, wherein transaction velocity represents a number of transactions initiated at the restaurant per unit time; and define an average of the top percentile transaction velocity as the maximum restaurant capacity.

23. The at least one non-transitory computer-readable storage media of claim 21, wherein the computer-executable instructions further cause the processor to:

determine at least one of a time of day, day of week, time of year, holiday, month, season, and weather associated with the selected time interval;

identify the similar historical time interval as having the at least one of the time of day, day of week, time of year, holiday, month, season, and weather similar to the selected time interval; and retrieve historical transaction data for the similar historical time interval.

24. The at least one non-transitory computer-readable storage media of claim 21, wherein the computer-executable instructions further cause the processor to:

calculate an average transaction amount associated with the restaurant using the historical transaction data;

determine a number of transactions initiated within the similar historical interval;

calculate a total transaction amount of the number of transactions initiated within the similar historical interval;

calculate an adjusted number of transactions by dividing the total transaction amount by the average transaction amount; and calculate the historical capacity level by dividing the adjusted number of transactions by the maximum restaurant capacity.

25. The at least one non-transitory computer-readable storage media of claim 21, wherein the computer-executable instructions further cause the processor to apply an offset to the selected time interval based on a restaurant type associated with the restaurant.

26. The at least one non-transitory computer-readable storage media of claim 25, wherein the computer-executable instructions further cause the processor to:

retrieve an opening time associated with the restaurant;

determine a transaction time of a first transaction initiated at the restaurant on a plurality of days within the period of time; and calculate the offset by determining the average difference between the opening time and the transaction time of the first transaction initiated at the restaurant.

* * * * *